United States Patent
Marsh et al.

(10) Patent No.: US 7,627,447 B2
(45) Date of Patent: Dec. 1, 2009

(54) METHOD AND APPARATUS FOR LOCALIZING AND MAPPING THE POSITION OF A SET OF POINTS ON A DIGITAL MODEL

(75) Inventors: Joseph C. Marsh, St. Louis, MO (US); Christopher G. Riegel, St. Louis, MO (US); Philip L. Freeman, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/626,168

(22) Filed: Jan. 23, 2007

(65) Prior Publication Data

US 2008/0177411 A1      Jul. 24, 2008

(51) Int. Cl.
*G01P 15/00* (2006.01)
(52) U.S. Cl. .................................................. 702/141
(58) Field of Classification Search ................. 702/141; 714/33
See application file for complete search history.

(56) References Cited

U.S. PATENT DOCUMENTS

| | | | |
|---|---|---|---|
| 4,685,054 A * | 8/1987 | Manninen et al. ............. | 700/86 |
| 2003/0043964 A1 | 3/2003 | Sorenson | |
| 2003/0139836 A1 | 7/2003 | Matthews et al. | |
| 2008/0141072 A1* | 6/2008 | Kalgren et al. ................ | 714/33 |

FOREIGN PATENT DOCUMENTS

EP          1496474  A1     1/2005

OTHER PUBLICATIONS

Karlsson et al., "The vSLAM Algorithm for Robust Localization and Mapping", Proceedings of the 2006 IEEE, International Conference on Robotics and Automation, Barcelona, Spain, Apr. 2005, pp. 24-29.
Ezquerra et al., "An Approach to 3D Pose Determination", ACM Transactions on Graphics, vol. 15, No. 2, Apr. 1996, pp. 99-120.
Newmann et al., "A New Solution to the Simultaneous Localisation and Map Building (SLAM) Problem—the GPF", The University of Sydney NSW 2006, Australia, 12 pages.
Fox et al., "Markov Localization for Mobile Robots in Dynamic Environments", Journal of Artificial Intelligence Research 11 (1999), submitted Jan. 1999, published Nov. 1999, pp. 391-427.

(Continued)

*Primary Examiner*—Tung S Lau
*Assistant Examiner*—Xiuquin Sun
(74) *Attorney, Agent, or Firm*—Yee & Associates, P.C.; James M. Poole (57) ABSTRACT

A computer implemented method, apparatus and computer usable program product for mapping a position of a physical point on a digital model. Sensor data for the physical point is received from a sensor unit and a position of the physical point is correlated to the digital model. An alignment probability for the correlated position is calculated and the calculated value is then compared to a stored threshold value. If the alignment probability for the correlated position does exceed a predetermined threshold probability, an aligned position is formed. An aligned position of the physical point is stored relative to the digital model, responsive to a store map location command.

10 Claims, 6 Drawing Sheets

OTHER PUBLICATIONS

Ababsa et al., "Robust Line Tracking Using a Particle Filter for Camera Pose Estimation", Nov. 1-3, 2006, pp. 207-211.

Bosse et al., "An Atlas Framework for Scalable Mapping", Proceedings ICRA'03 IEEE International Conference on Robotics and Automation, vol. 2, Sep. 2003, pp. 1899-1906.

Cole et al., "Using Naturally Salient Regions for SLAM with 3D Laser Data", IEEE International Conference on Robotics and Automation (ICRA) SLAM Workshop, Barcelona, Apr. 2005, pp. 1-8.

Newman et al., "SLAM-loop Closing with Visually Salient Features", Proceedings of the 2005 IEEE International Conference on Robotics and automation, 2005, ICRA 2005, Apr. 2005, pp. 635-642.

Jensfelt et al., "A Framework for Vision Based Bearing Only 3D SLAM", 2006. ICRA 2006. Proceedings 2006 IEEE International Conference on Robotics and Automation, May 15-19, 2006 pp. 1944-1950.

Rikoski et al., "Stochastic Mapping Frameworks", Proceedings ICRA'02 IEEE International Conference on Robotics and Automation, MIT, 2002, vol. 1, pp. 426-433.

Singh et al., "Recent Results in Extensions in Simultaneous Localization and Mapping", Proceedings of the International Symposium on Experimental Robotics, Jul. 2002, The Robotics Institute, Carnegie Mellon University, pp. 1-12.

Newman et al., "Autonomous Feature-Based Exploration", Proceedings of the 2003 IEEE International Conference on Robotics & Automation, Taiwan, Sep. 2003, pp. 1234-1246.

Dobnik et al., "Teaching a robot spatial expressions", Proceedings Second ACL-SIGSEM Workshop on The Linguistic Dimensions of Prepositions and their Use in Computational Linguistics Formalisms and Applications, Essex University. 2005, pp. 1-8.

* cited by examiner

METHOD AND APPARATUS FOR LOCALIZING AND MAPPING THE POSITION OF A SET OF POINTS ON A DIGITAL MODEL

BACKGROUND

1. Field

The present invention relates generally to an improved data processing system and in particular to mapping the position of a point. Still more particularly, the present invention relates to a computer implemented method, apparatus, and computer usable program product for sensing the position of a set of points relative to a physical object and correlating the position of the set of points to a digital model of the physical object.

2. Background

An example of a point is a defect on a manufactured part. A set of points is one or more points. A set of points may, for example, form a circle, an ellipsis, a line, and/or a three-dimensional shape. As used herein, a defect is a term used in manufacturing to denote an imperfection in a part under manufacture. Engineers study defects to correct the current defective part. The defects are also studied to understand and prevent further defective parts through identifying defect trends over time. To effectively find and correct the cause of defects, engineers may need to identify the location of a given defect.

Defect mapping is a method of localizing and communicating the position of a defect in a defect report. Defect position information may take the form of a simple "×" or other marking on a drawing, or other pictorial representation of the part. Currently, a user may make an imprecise identification of the location of the defect on the actual physical part, and correlate that location to a paper drawing to identify the location of the defect in the paper drawing. However, many times the paper drawing of the part will not show a view of the part necessary to localize the defect. Also, the scale of the "×" marking the defect location on the paper drawing may be such that a large area of the physical object is searched to find a small defect. In addition, indicating a location of a defect through marking a drawing by hand may provide incomplete information regarding the location of a defect.

In other scenarios, the defect location may be logged into an existing database by a user, who may measure, estimate, or omit the three-dimensional coordinates X, Y, and Z that define the position of the defect. These processes are imprecise, inaccurate, and burdensome to users.

Therefore, it would be advantageous to have an improved method, apparatus, and computer usable program code for identifying defects on a physical object.

SUMMARY

Advantageous embodiments of the present invention provide a computer implemented method, apparatus, and computer usable program product for mapping a set of physical points to a digital model. The computer implemented method for locating defects comprises receiving sensor data for a defect on a manufactured object, correlating the location of the defect on the manufactured object to a location on a digital model of the manufactured object, and storing the sensor data for the defect in a database in association with location on the digital model.

In another embodiment, a process receives sensor data for a set of physical points from a sensor unit and correlates a position of the set of physical points to a digital model. The process calculates an alignment probability for the correlated position and compares the calculated value to a stored threshold value. If the alignment probability for the correlated position exceeds the predetermined threshold probability, an aligned position is formed. An aligned position of the physical point is stored relative to the digital model, responsive to a store map location command.

In another illustrative embodiment, a computer program product having computer usable program code encompasses the steps for mapping a set of physical points to a digital model. The computer program product is executed to perform the steps a computer implemented method for mapping a set of physical points to a digital model. The computer implemented method comprises receiving sensor data for the set of physical points from a sensor unit to form received sensor data, and aligning the received sensor data from the sensor unit to a set of place-identifiers in the digital model, wherein a position of the set of physical points is correlated to the digital model to form a correlated position.

In yet another illustrative embodiment, an apparatus comprises the sensors and a data processing system for performing the steps for mapping a set of physical points to a digital model.

The features, functions, and advantages can be achieved independently in various embodiments of the disclosure, or may be combined in yet other embodiments.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

DETAILED DESCRIPTION

Figure 1:
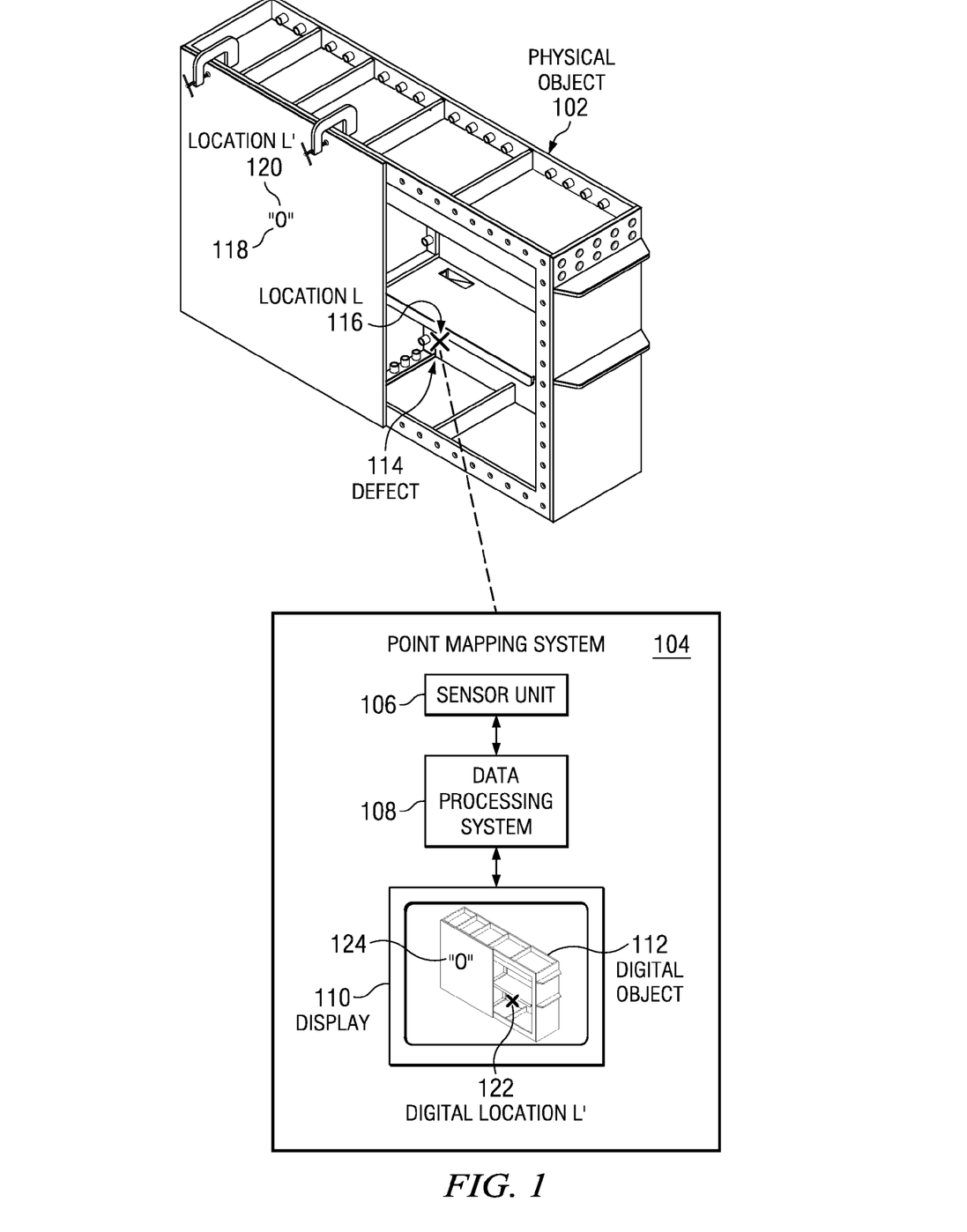
FIG. 1 is a diagram of a point mapping system in accordance with an illustration of the advantageous embodiment of the present invention.

With reference now to the figures, and in particular with reference to FIG. 1, a diagram of a point mapping system in accordance with an advantageous embodiment of the present invention. It should be appreciated that FIG. 1 is only exemplary and is not intended to assert or imply any limitation with regard to the environment in which different embodiments may be implemented.

Factory parts may have digital models stored in a data processing system, typically, a computer aided design (CAD) system. Computer aided design is a dominant geometry-authoring tool and involves both software, and in some instances, special purpose hardware. Current computer aided design systems create digital models that range from two-dimensional (2D) vector based drafting systems to three-dimensional (3D) solid and surface modelers.

A digital model is a multi-dimensional geometric object description. The digital format of the model includes a description of the object using coordinates and numerical descriptions of the position of the object in a multi-dimensional space. This format is typically used in a computer aided drawing system. Digital models may be suitable for documentation and visualization, as well as for complex simulations, manipulations, and analysis of the object.

A digital model may use place-identifiers to denote features on or in a physical object. A place-identifier is a feature on the physical object that serves as a guide in location, such as the edge of a fuel tank or a series of fasteners, for example, associated with an airplane object. An airplane object is an airplane or any part of an airplane. The digital model is comprised of a plurality of place-identifiers, each with unique coordinates within the digital model.

In some instances, digital models are implemented in the design phase of a manufactured object or part. The digital models may be used to create castings or molds for the manufactured part. Digital models may also be used to provide a three-dimensional map of the part.

An implementation of an advantageous embodiment of the present invention allows a user to aim a sensor unit at a set of points on a manufactured object and correlate the set of points to a digital map of the manufactured object. Therefore, upon recalling the digital map, a user may see accurately and precisely where the set of points is located. This feature of the advantageous embodiment is well suited to track defects on manufactured objects.

The different embodiments recognize that current defect position techniques do not provide a method for sensing the position of a set of points on a physical object and correlating the position of the set of points to the digital model of the physical object. As users build and assemble parts or perform maintenance and repairs on parts, defects may be observed. One of the advantageous embodiments of the present invention provides a computer implemented method, apparatus, and computer program product for mapping the defects observed.

FIG. 1 shows physical object 102. Physical object 102 may be any physical object, including parts under manufacture or repair. For example, the advantageous embodiments may be implemented on parts that have both internal and external surfaces, and/or expansive parts with minimal features. An internal surface may include, for example, the inside of a fuel tank or wing box for an airplane wing. Parts may also have featureless expanses. A featureless expanse is a portion of a part that does not have place-identifiers. For example, a section of sheet metal used for a wing component on an airplane may include a featureless expanse along the outer surface of the wing.

An advantageous embodiment provides point mapping system 104 equipped with sensor unit 106 to scan a defect on a part, such as physical object 102. In this example, a user, such as a factory operator that observes a defect, carries sensor unit 106 to the defect on the part under assembly. If the defect is observed in the inside of a fuel tank, for example, sensor unit 106 may be taken inside the fuel tank. The operator may press a button on sensor unit 106 to activate a store map location command when the operator perceives that the defect is sensed by sensor unit 106. A laser pointer indicating the sensing position may optionally be included. Point mapping system 104 also may be mounted on a robot that scans physical object 102 for defects. Point mapping system 104 may contain data processing system 108 and/or display 110 in a compact unit, or data processing system 108 and/or display 110 may be located remote to sensor unit 106. Digital object 112 is the digital model of physical object 102 and may be viewed on display 110.

Physical object 102 is marked with an "×" icon denoting defect 114 corresponding to location L 116 on physical object 102. Defect 114 is located on an internal surface of the part. Defect 118 is marked with an "O" icon and is located on an external surface of physical object 102, in a featureless area of the part at location L' 120. The "O" icon illustrates that the defect is not a single point but a set of points. Sensor unit 106 may collect sensor data from location L 116 and location L' 120, and data processing system 108 may match the sensor data to digital object 112. Digital object 112 is a digital model of physical object 102. The digital depiction of the defect is indicated in digital object 112 with an "×" icon 122 and an "O" icon 124. Thus, the physical defect on the part is mapped to the digital model of the part.

Note that digital location L' 122 is indicated on digital object 112, which is pictured on display 110. The defect position relative to the digital model of the part is then stored. Thus, the location of the defect, location L 116, has been mapped onto the three-dimensional model of digital object 112.

Digital object 112, with defect locations 122 and 124 indicated, may then be recalled. Locations 122 and 124 may be recalled in these examples on a display joined with a data processing system, or on a display included on the compact device. Engineering or other personnel may then return to the physical location of the defect by observing where, within the digital model, the defect is located.

An advantageous embodiment of the present invention envisions the compilations of defect maps that aid in overall defect reduction. Throughout the examples herein, a factory environment is used to describe the advantageous embodiments of the present invention. Those of ordinary skill in the art will appreciate that the scope of the present invention is not limited by these examples and there are many applications for the advantageous embodiments of the present invention.

Figure 2:
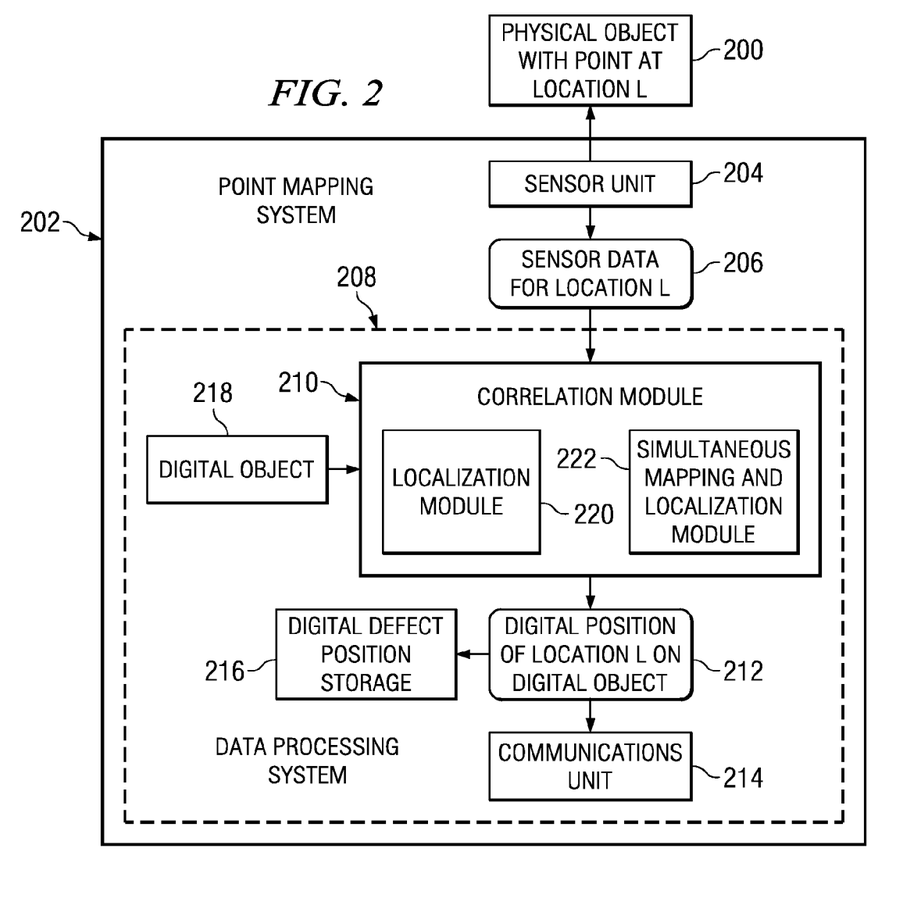
FIG. 2 is a block diagram of components for a point mapping system in accordance with an illustration of the advantageous embodiment of the present invention.

FIG. 2 is a block diagram of components of a defect mapping system in accordance with an advantageous embodiment of the present invention. Physical object 200 is a physical object, such as physical object 102 in FIG. 1, with a point at location L, such as location L 116 in FIG. 1. Physical object 200 may be a part under assembly, and the point may be a defect as in the above example. Point mapping system 202 comprises sensor unit 204, which collects sensor data for location L 206.

Sensor unit 204 includes an image-collecting unit such as, for example, a digital video camera, a laser triangulating system, or acoustic location technology, for example sonar. A video camera, as used herein, applies to image sensors of all frequencies of electromagnetic radiation. A set of video cameras means one or more video cameras. Laser triangulation is the process of finding coordinates and distances to a point by calculating the length of one side of a triangle, and by finding the measurements of angles and sides of the triangle formed by that point and two other known reference points, using laser technology. A laser, an acronym derived from light amplification by stimulated emission of radiation, is an optical source that emits photons in a coherent beam. Those of ordinary skill in the art, after careful reading of this specification, will appreciate how a laser application may be applied in context herein, and therefore, laser technology will not be discussed further. Sonar is a technique that uses sound propagation to map objects.

Sensor unit 204 may be implemented as a compact unit that is handheld, such as sensor unit 106 in FIG. 1. An image sensor may employ, for example, a charge coupled device (CCD) or complementary metal oxide semiconductor (CMOS) technology to sense images. However, any image sensor is within the scope of the advantages embodiments of the present invention. An image sensor may include a microprocessor to process raw image data and communicate with communications unit 214.

Sensor unit 204 may optionally include an accelerometer to track the distance and direction that sensor unit 204 travels. An accelerometer is a device for measuring acceleration. An accelerometer inherently measures its own motion, in contrast to a device based on remote sensing, such as a global positioning system (GPS). Therefore, an accelerometer may be used for tracking the position of sensor unit 204, and providing data concerning direction and distance of travel in environments unsuitable for remote sensing. The interior portions of a manufactured part are one such example of this type of environment.

Therefore, sensor data 206 may include a stream of video, or sampling of digital images, and in addition, the distance and direction of travel data from the accelerometer. Point mapping system 202 also comprises one or more data processing systems 208. Data processing system 208 may be embodied in one system, or data processing system 208 may be a plurality of interconnected data processing systems. Data processing system 208 comprises correlation module 210, which localizes the digital position data of location L 212, and communicates the digital position data of location L 212 through communications unit 214 to permanent storage for the location L in digital defect position storage 216. Correlation module 210 correlates the physical point with digital object 218.

Correlation module 210 includes localization module 220. Correlation module 210 may optionally include simultaneous localization and mapping module 222. Simultaneous localization and mapping module 222 may be optionally included to map point defects, such as defect 118 in FIG. 1. Defect 118 is located in a relatively featureless position on the part, in which there are few place-identifiers. Simultaneous localization and mapping module 222 maps the free space portion of the digital image, using localization module 220 to confirm localization of points. In other words, if a sensor unit, such as sensor unit 204, senses a defect on a featureless portion of the part, simultaneous localization and mapping module 222 may map a track to the location of the defect and thus, correlate the defect location to the digital model. While simultaneous localization and mapping module 222 is capable of continuous localization and mapping, the module is optional and may not be a necessary option unless there are no place-identifiers available for location correlation. There are several simultaneous localization and mapping modules available for use in simultaneous localization and mapping module 222, and the advantageous embodiments of the present invention are not limited to a specific module.

In one embodiment, point mapping system 202 is a compact unit, which may be handheld containing sensor unit 204, a detached data processing system capable of correlating the position of the point to a digital model, or a display that communicates with the user of point mapping system 202.

In another embodiment, point mapping system 202 may comprise a compact unit that contains sensor unit 204 and communications unit 214. Communications unit 214 may then communicate data to a unit or units with additional data processing capabilities. Other embodiments of point mapping system 202 may not include compact units and/or may be remotely controlled sensor units.

Figure 3:
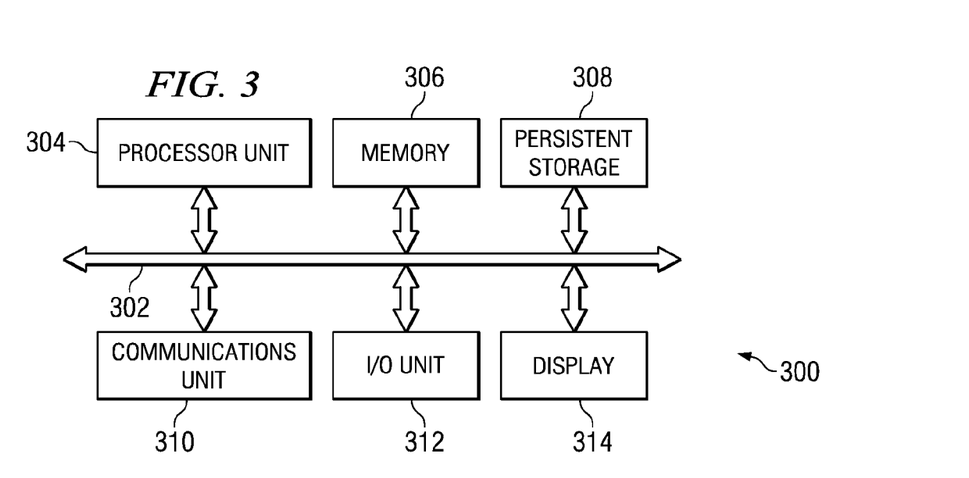
FIG. 3 is a block diagram of a data processing system in accordance with an illustration of the advantageous embodiment of the present invention.

Turning now to FIG. 3, a diagram of data processing system 300 is depicted in accordance with an advantageous embodiment of the present invention. Data processing system 300 is an example of a data processing system that may be used, such as data processing system 208 in FIG. 2. In this illustrative example, data processing system 300 includes communications fabric 302, which provides communication between processor unit 304, memory 306, persistent storage 308, communications unit 310, I/O unit 312, and display 314.

Processor unit 304 serves to execute instructions for software that may be loaded into memory 306, for example, software to implement a correlation module, such as correlation module 210 in FIG. 2. Processor unit 304 may be a set of one or more processors, or may be a multi-processor core, depending on the particular implementation. Further, processor unit 304 may be implemented using one or more heterogeneous processor systems in which a main processor is present with secondary processors on a single chip. Memory 306, in these examples, may be, for example, a random access memory (RAM). Persistent storage 308 may take various forms depending on the particular implementation. For example, persistent storage 308 may be a hard drive, a flash memory, a rewritable optical disk, a rewritable magnetic tape, or some combination of the above, and may provide database storage.

Communications unit 310, in these examples, provides for communication with other data processing systems or devices. Communications unit 310 may be a network interface card. I/O unit 312 allows for input and output of data with other devices that may be connected to data processing system 300. For example, I/O unit 312 may provide a connection for user input though a keyboard and a mouse. Further, I/O unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306.

Figure 4:
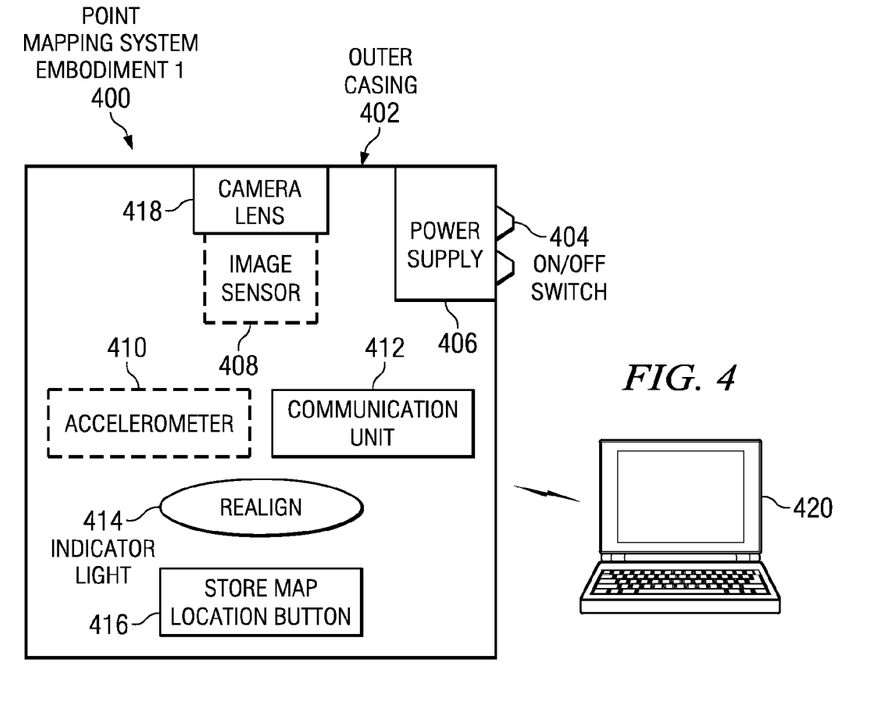
FIG. 4 is a diagram of a compact unit for a point mapping system in accordance with an illustration of the advantageous embodiment of the present invention.

FIG. 4 is a diagram of an exemplary compact unit for a point mapping system in accordance with an advantageous embodiment of the present invention. Point mapping system 400 is an embodiment of point mapping system 202 in FIG. 2. In this example, point mapping system 400 is a handheld unit. A sensor unit, such as sensor unit 204 in FIG. 2, is enclosed in outer casing 402. On/off switch 404 controls power supply 406. Power supply 406 may be any type of known or available power supply, including but not limited to, batteries. Power supply 406 provides power for the operation of image sensor 408, accelerometer 410, which is optional, communication unit 412, indicator light 414, and store map location button 416. Camera lens 418 is attached to image sensor 408. Camera lens 418 extends to an opening in outer casing 402.

Accelerometer 410 may consist of a suspended cantilever beam or proof of mass with deflection sensing and circuitry. Proof of mass is also referred to as seismic mass. For instance, accelerometer 410 may be a three axis, micro electromechanical system (MEMS) device. As another example, accelerometer 410 may be a laser accelerometer. Accelerometer 410 may also contain a microprocessor for processing accelerometer data and communicating with communication unit 412. Accelerometer 410 aids in locating the position of the compact unit. Accelerometer 410 produces directional and distance measurement data.

Communication unit 412 provides for communication with data processing system 420 or other devices, and may contain a microprocessor and antenna for wireless communication. Communication unit 412 is an example of an implantation of communications unit 310 in FIG. 3. Another embodiment envisions the defect mapping system implemented using wired connections. Communication unit 412 communicates image and accelerometer data to data processing system 420 for analysis. Communication unit 412 may also receive information in the form of an alignment alarm from data processing system 420, which causes indicator light 414 to illuminate. Store map location button 416 issues the command to data processing system 420 to save the currently indicated location to permanent storage through communication unit 412.

Figure 5:
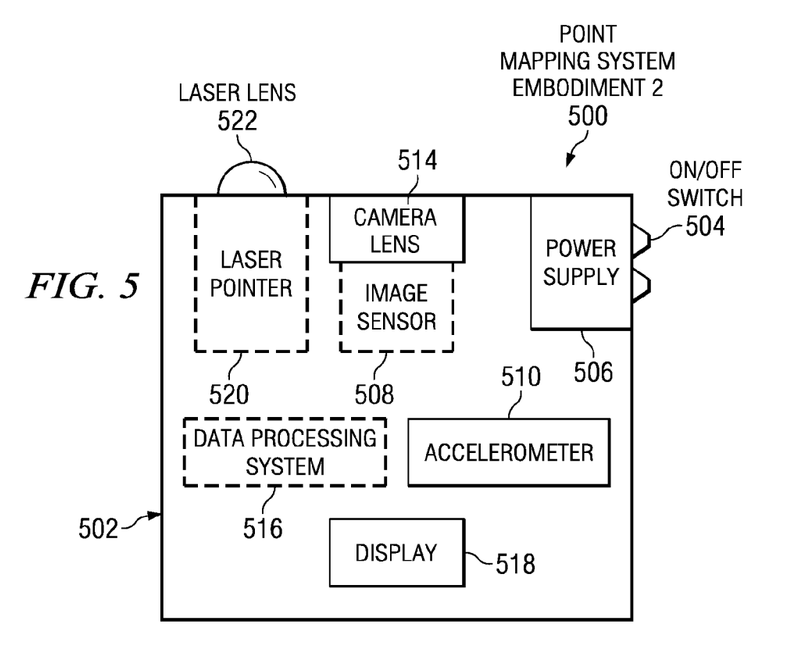
FIG. 5 is a diagram of an exemplary compact unit for a point mapping system in accordance with another illustration of the advantageous embodiment of the present invention.

Referring now to FIG. 5, another embodiment of a compact unit, which may be handheld, for a point mapping system is shown in accordance with the advantageous embodiments of the present invention. Point mapping system 500 is similar to point mapping system 400 in FIG. 4 in that it comprises outer casing 502, on/off switch 504, power supply 506, image sensor 508, accelerometer 510 and camera lens 514. However, point mapping system 500 envisions data processing system 516 integrated within outer casing 502 of point mapping system 500. Display 518 is the user interface in these examples and may, for example, be a touch screen system. The user may receive information and instructions from data processing system 516. Point mapping system 500 also has optional laser pointer 520 with laser lens 522 extending from outer casing 502. Laser pointer 520 aids the user in orienting image sensor 508. As the operator is scanning the object, laser pointer 520 illuminates the subject area of the scan with a point of light. Other advantageous embodiments are within the scope of the present invention.

Figure 6:
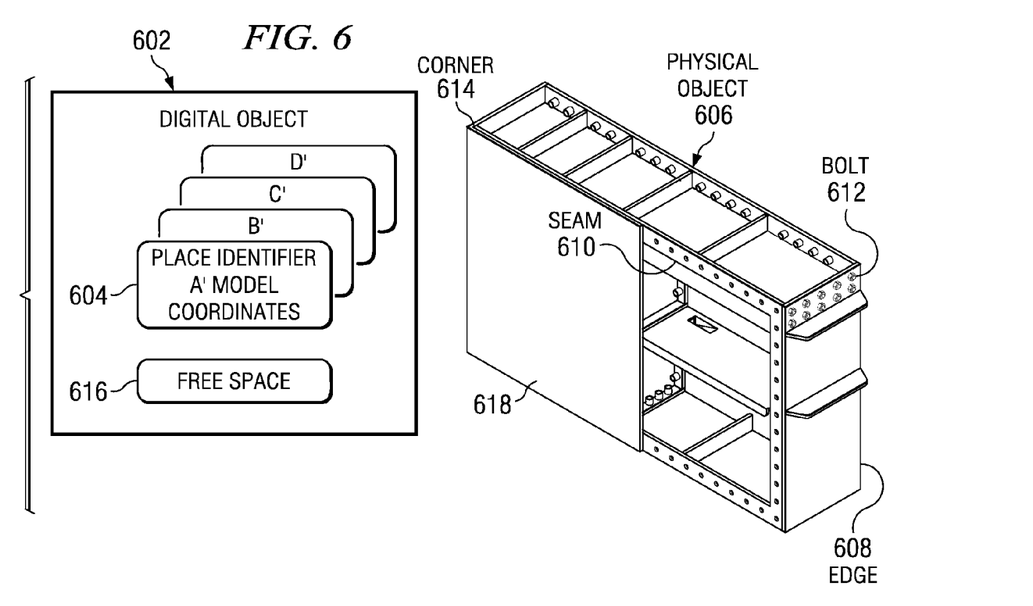
FIG. 6 is a block diagram of a digital model for a point mapping system in accordance with an illustration of the advantageous embodiment of the present invention.

FIG. 6 depicts a block diagram of a digital object, such as digital object 112 in FIG. 1, in accordance with the advantageous embodiments of the present invention. Digital object 602, such as digital object 218 in FIG. 2, is a representation of the surfaces of a part, a fixture, or other object of interest in a digital format. The surfaces may be external or internal to the part.

Digital object 602 contains place-identifiers 604. Place-identifiers 604 are landmarks on the part. A landmark is a prominent or conspicuous feature on an object that serves as a guide. In other words, place-identifiers 604 are the visual clues as to a location on the digital model. Place identifiers 604 correlate to physical object 606. Physical object 606 may be a manufactured part, such as physical object 102 in FIG. 1. Features may include, but are not limited to, edge 608, seam 610, bolt 612, and corner 614, and may also include such features as hinges, fasteners, and markings. Fixtures holding the part may also be included in the digital model and may be used for place-identifiers. The remaining portion of the digital model may be thought of as free space 616 within a three-dimensional grid. Free space 616 on physical object 606 may, for example, correlate to front surface 618, which has few distinguishing place-identifiers.

Figure 7:
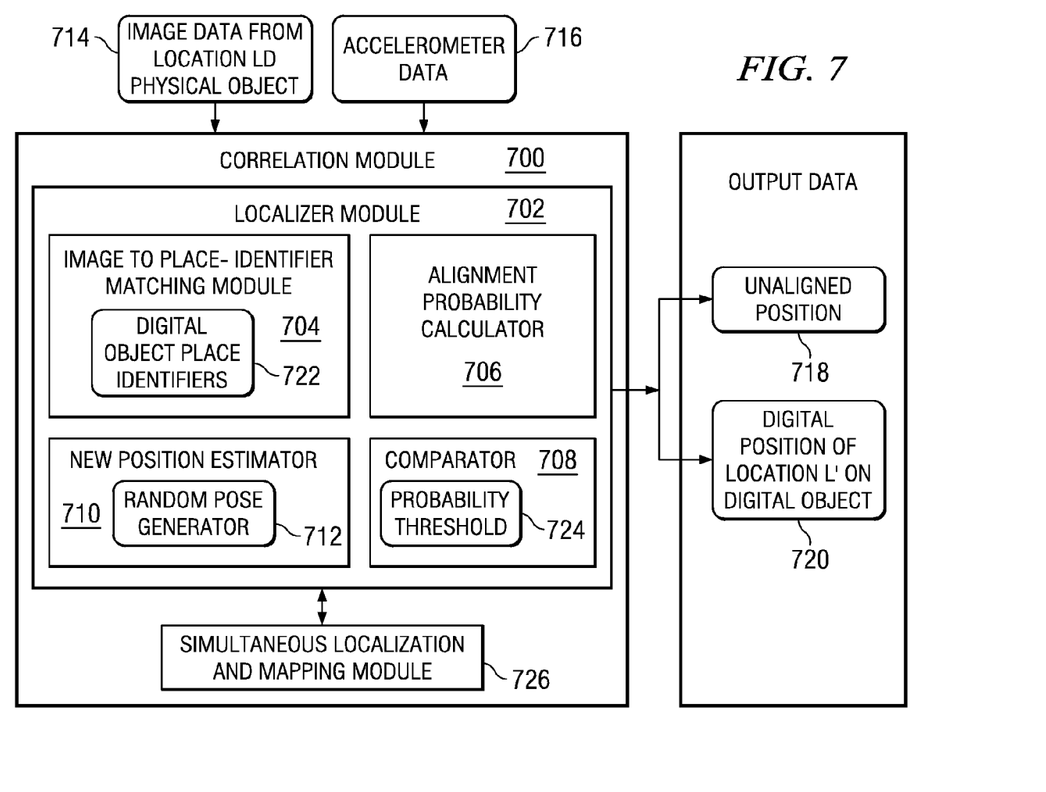
FIG. 7 is a block diagram illustrating components in a correlation module for a point mapping system in accordance with an illustration of the advantageous embodiment of the present invention.

FIG. 7 is a block diagram of components of a correlation module in accordance with the advantageous embodiments of the present invention. Correlation module 700, such as correlation module 210 in FIG. 2, comprises localizer module 702 and optional simultaneous localization and mapping module 726. Localizer module 702 comprises image to place-identifier matching module 704, alignment probability calculator 706, comparator 708, and new position estimator 710. New position estimator 710 may include a random pose generator 712, or another method of estimating new positions. Localizer module 702 receives image data 714 from an image sensor, such as image sensor 408 in FIG. 4, and accelerometer data 716 from an accelerometer, such as accelerometer 410 in FIG. 4, as input. In these examples, output data from correlation module 700 is either an unaligned position indication 718 or the digital position of location L 720.

Image to place-identifier matching module 704 correlates image data 714 to the stored place-identifiers 722 from the digital model to determine a match. A match between image data 714 and place-identifiers 722 locates the image on the digital model. There may be instances in which more than one place-identifier 722 correlates with image data 714.

Alignment probability calculator 706 calculates the alignment probability that a correlated image to place-identifier is a match for each of the place-identifiers 722 that are correlated. The highest alignment probability calculated is compared to a predefined alignment probability threshold 724, and compared in comparator 708.

Accelerometer data 716 is used by new position estimator 710. New position estimator 710 may take the last known position of the sensor unit, analyze the distance and directional data from the accelerometer, and estimate a new position. Place-identifiers 722 for the new estimated position are correlated to image data 714 in image to place-identifier matching module 704.

New position estimator 710 may first analyze the global topology of the object and generate a distribution of three-dimensional coordinate triplets for the current pose of the image data. Pose is the orientation of the image in respect to the physical object. A pose defines a three-dimensional position in a three-dimensional computer aided drafting model, as well as an orientation at that position. Therefore, pose data may include X, Y, and Z coordinates, as well as other parameters such as roll, pitch, and yaw. To define roll, pitch and yaw, three lines may be imagined running through an object and intersecting at right angles at the center of the object: rotation around the front-to-back axis is called roll; rotation around the side-to-side axis is called pitch; and rotation around the vertical axis is called yaw.

Using the generated set of three-dimensional points, the new position estimator 710 considers the local topology to produce a generalized curve representing an estimate of the image position. Thus, the resultant estimated position is not constrained to lie along a straight line from the last known position, but may lie along a generalized curve. New image data correlates with a higher probability to a particular curve. The less likely curves are then discarded as improbable.

Optionally, correlation module 700 may include a simultaneous localization and mapping module 726. In such a case, simultaneous localization and mapping module 726 may use localizer module 702 for localization data, and continuously map the object as new image data from physical object 714 and accelerometer data 716 become available.

The basic components of simultaneous localization and mapping module 726 are the recognition of new visual landmarks that may be added to the place-identifiers 722, such as place identifiers 604 in FIG. 6, for the digital object. Each of these landmarks is associated with an image pose and is given unique coordinates. The module estimates measurement from the last place-identifier and assesses the reliability of the measurement. Reliable measurements, as defined by a probability, are then mapped into the digital object and unreliable measurements are discarded. Probability threshold 724 may be used to compare measurements in simultaneous localization and mapping module 726.

Figure 8:
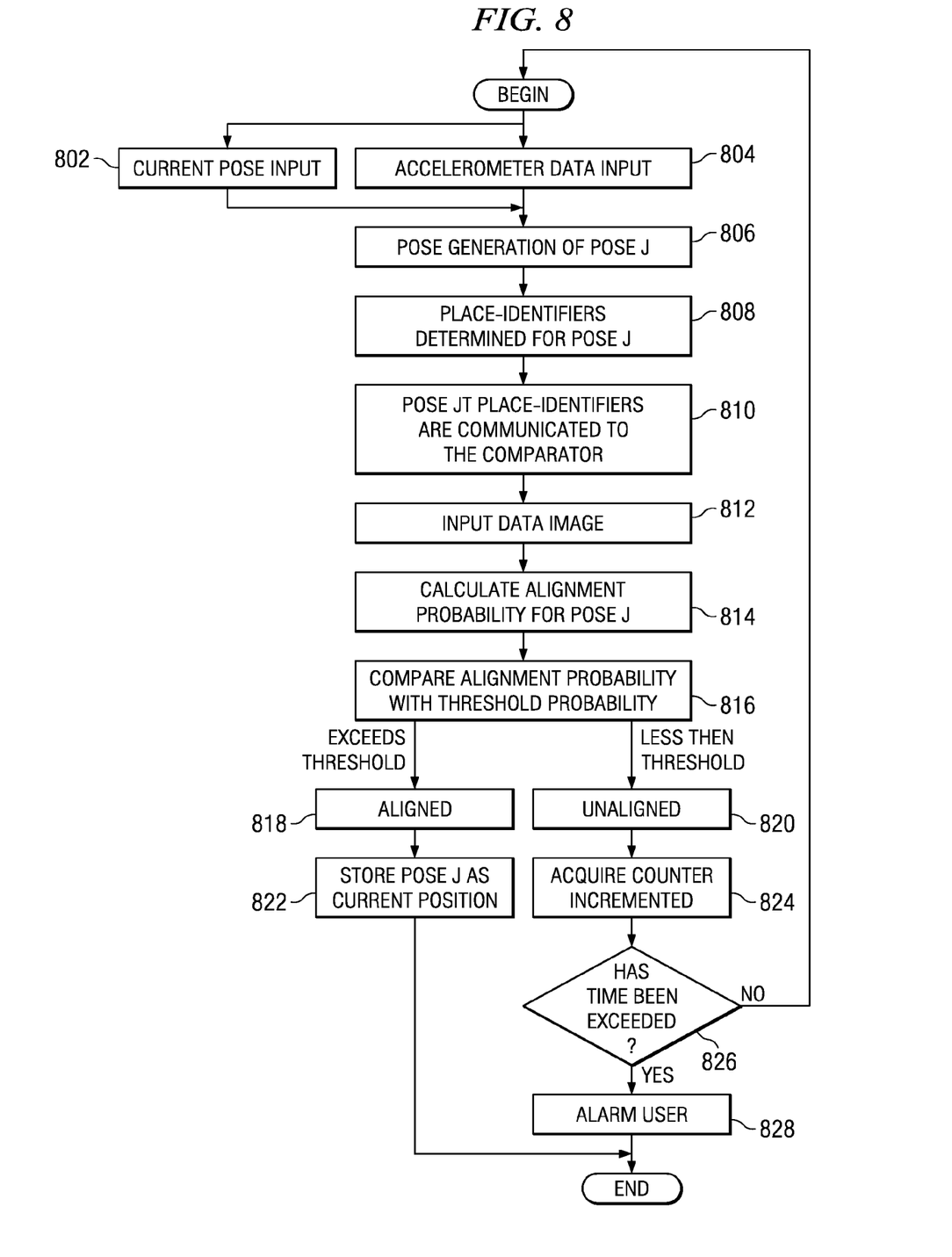
FIG. 8 is a high level localization flowchart of a point mapping system in accordance with an illustration of the advantageous embodiments of the present invention.

FIG. 8 is a high-level flowchart of a process for a localization module in accordance with the advantageous embodiments of the present invention. The illustrative process in FIG. 8 is implemented by a hardware/software component for collecting image data, such as sensor unit 204 in FIG. 2, and localizing data, such as localization module 702 in FIG. 7.

In this embodiment, the localization module uses an iterative pose generator that takes multiple inputs. One of the inputs is the current pose (operation 802). The current pose may be a known initial position, or the pose as calculated by the last iteration of the localization module. The current pose is an aligned position. An aligned position is one in which the image data from the sensor unit correlates to the place-identifiers in the digital model at a greater than threshold alignment probability. The sensor unit position may be aligned to the digital model because the sensor unit is initiated in a fixed position receptacle, or an initial operation is performed which aligns the sensor unit to the digital model. In other words, the current image from the sensor unit is correlated to the digital model.

A second input is data from the accelerometer (operation 804). Accelerometer data may be used to determine the values input to a number generator, such as a Gaussian random number generator, that the pose generator uses. The accelerometer will output a measured X, Y, and Z movement, as well as a measured roll, pitch and yaw movement. These measured movements become the mean values input to the pose generator.

In one embodiment, the image data is checked for changes, indicating if the sensor unit has moved. If the image has not changed since the last image, the process remains aligned. In another embodiment, if the accelerometer data indicates that the sensor unit is at rest, the process remains in an aligned state. In yet another embodiment, continuous images are input and analyzed.

The pose generator takes an input pose and data from the accelerometer to generate a number of random poses, numbered 1, 2, . . . , j, j+1, . . . , n (operation 806). Next, the localization module determines if any place-identifiers are in the digital model for pose j (operation 808).

The poses generated are communicated to a comparator (operation 810). The comparator also receives image data input (operation 812). The comparator then calculates a probability of alignment between pose j and the image data input (operation 814). The comparator, such as comparator 708 in FIG. 7, then compares the calculated alignment probability to a predetermined threshold alignment probability (operation 816). A predetermined threshold alignment probability is a user-preset value. Comparator operation 816 ensures system administrator control of the quality of the positional alignment. If the probability of alignment exceeds the threshold alignment, then the process is aligned (operation 818). If the probability that the image data aligns with pose j is lower than the threshold probability, the image data is not aligned with the digital object (operation 820).

Optionally, when the probability percentage exceeds threshold, the value n may be reduced, thus reducing the computational needs of the system and allowing the system to process incoming data faster. If the last iteration did not produce a value exceeding the threshold, the value n may be increased to look for more potential poses.

If the probability percentage exceeds threshold (operation 818,) then the localization module stores pose j as the current position, and the probability percentage associated with pose j alignment (operation 822), with the process terminating thereafter.

If the probability percentage does not exceed threshold (operation 820), then the acquire time counter is incremented (operation 824). Acquire time may be set by a system administrator and is used to allow the localizer system several iterations before indicating an alarm to the user.

Next, the localizer system determines whether the acquire time has been exceeded (operation 826). If the acquire time has been exceeded, the localizer system indicates an alarm to the user (operation 828). The alarm may be an audio or visual indicator activated to alert the user to the unaligned state of the localizer system. If the acquire time has not been exceeded, the localizer system returns to the beginning of the process with no change to the current position.

Those of ordinary skill in the art will appreciate that there are known methods and algorithms of estimating a new position or pose for the sensor unit and the image data. The advantageous embodiments of the present invention are not limited by a particular implementation of an algorithm performing an estimated position or pose function.

Figures 9, 10:
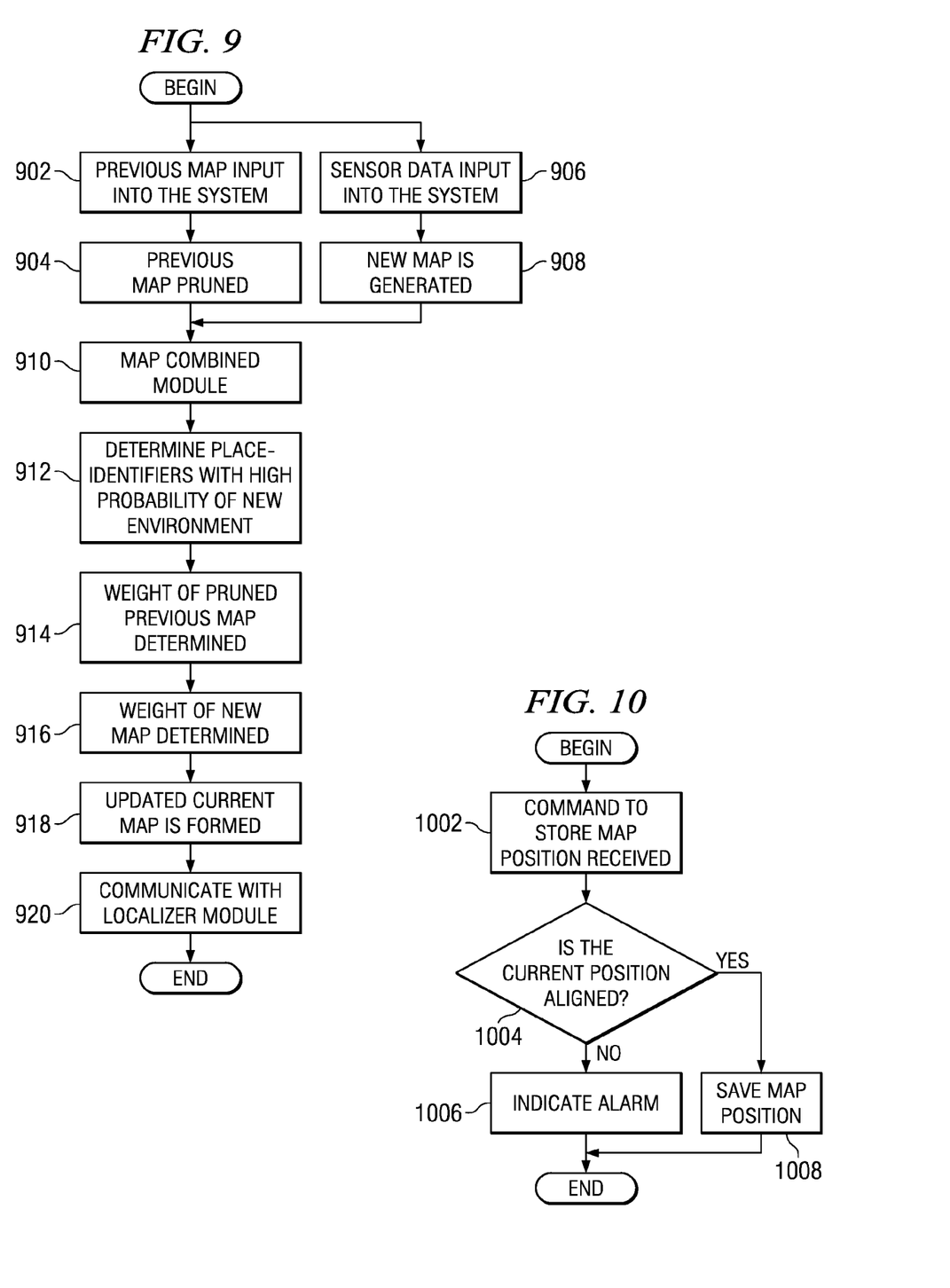
FIG. 9 is a high level flowchart illustrating the process flow for a simultaneous localization and mapping module of the point mapping system in accordance with an illustration of the advantageous embodiment of the present invention.
FIG. 10 is a flowchart of the save map position process for the point mapping process in accordance with an illustration of the advantageous embodiment of the present invention.

FIG. 9 is a high-level flowchart illustrating the process flow for a simultaneous localization and mapping module of the point mapping system in accordance with an advantageous embodiment of the present invention. The different operations shown in FIG. 9 are implemented by a hardware/software component for sensing a position of a point, such as sensor unit 204 in FIG. 2, and localizer module 702 in FIG. 7.

A simultaneous localization and mapping module map comprises a simultaneous localization and mapping algorithm that is comprised of voxels representing the three-dimensional space. A voxel is a three-dimensional pixel. The word voxel comes from combining a pixel and a volume. In other words, a voxel is a volume of three-dimensional space. The mapping module is working on a matrix of voxels, corresponding to X, Y, and Z coordinates, that represent the intersection of a camera's field-of-view.

The implementation of the simultaneous localization and mapping process begins with inputting the map from a previous iteration into a map pruning algorithm (operation 902). For efficiency, the map may be pruned so that the implementation only processes data within a certain range of the current position. In this embodiment, the pruning is accomplished by the area of interest detection module, which implements the map pruning algorithm (operation 904). Map pruning may involve copying the area of the map that the image data is likely to modify to a separate, smaller representation of the map that excludes items behind the camera and/or occluded by foreground objects.

The system inputs the current sensor data (operation 906) into a new map generator. The new map generator generates the new map using three-dimensional data (operation 908). In one embodiment, the three-dimensional new map may be created by two cameras that are separated by a known distance. A process that computes a disparity map from the images of the two cameras may be used to create a depth field from which three-dimensional data may be extracted.

Similarly, in another embodiment, a single camera and accelerometer may be used. The process may simulate the two-camera process by using the accelerometer data to determine the separation distance between two frames of the image data. Yet another embodiment may use laser triangulation to gather three-dimensional information in conjunction with a camera. Thus, a new map using the current sensor data is formed.

The new map and the pruned previous map are input into a map combiner module (operation 910). The process then determines if any place-identifiers are within the predicted environment of the sensor unit. In other words, the system will determine if any place-identifiers have a high probability of being represented on the new map (operation 912). For instance, if the accelerometer data indicates that the estimated position of the sensor unit is three meters west of the last aligned position and around an acute angle from the last place-identifier, the process will then model the predicted environment of the location of the sensor unit and determine if there are any place-identifiers within image sensor range of the current estimated position of the sensor unit.

A weight is then determined for the pruned previous map (operation 914), and a weight is determined for the new map (operation 916). The voxels that represent the free space between voxels that represent the location of place-identifiers will have their value increased. The voxels outside the field-of-view and voxels that are behind objects in the field-of-view are not modified. The maps that have a larger number of high value voxels will be weighted higher.

The weights are parameters that represent two percentages, which sum to 100. A higher new map weight means that the new map includes more localized place-identifiers than the pruned previous map. Further, a higher pruned previous map weight implies that place-identifiers seen in the image data are less likely to alter the updated map.

The result is an updated map (operation 918) that may be used by a localization module, such as localizer module 702 in FIG. 7 to confirm alignment (operation 920). Thus, the process ends.

Turning now to FIG. 10, a flowchart of a save map position process for the point mapping process is shown in accordance with the advantageous embodiments of the present invention. The different operations shown in FIG. 10 are implemented by a hardware/software component for sensing a position of a point, such as sensor unit 204 in FIG. 2, and correlation module 700 in FIG. 7. The process begins by receiving a command to save a map position (operation 1002). The process determines if the map position is aligned (operation 1004). If the map position is not aligned, an alarm is indicted and the process terminates (operation 1006). If the map position is aligned, the map position is stored (operation 1008), and thus the process terminates.

The flowcharts and block diagrams in the different depicted embodiments illustrate the architecture, functionality, and operation of some possible implementations of apparatus, methods, and computer program products. In this regard, each block in the flowchart or block diagram may represent a module, segment, or portion of code which comprises one or more executable instructions for implementing the specified function or functions. In some alternative implementations, the function or functions noted in the block diagram may occur out of the order noted in the figures. For example, in some cases, two blocks shown in succession may be executed substantially concurrently, or the blocks may sometimes be executed in the reverse order, depending upon the functionality involved.

Thus, the advantageous embodiments of the present invention provide a computer implemented method, apparatus, and computer usable program product to map a physical point to a digital model. The different embodiments can take the form of an entirely hardware embodiment, an entirely software embodiment, or an embodiment containing both hardware and software elements. In one embodiment, the features are implemented in software, which includes, but is not limited to, firmware, resident software, and microcode. For example, the features can be implemented in signal processing software modules on general purpose computers, digital signal processing (DSP) chip, field programmable gate arrays (FPA) integrated circuit, and application specific integration circuit (ASIC) chips utilizing firmware programming. For example, the smart averaging filter can be implemented entirely as software, entirely as hardware, or as a combination of hardware and software.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for mapping a set of physical points to a digital model, the method comprising:

receiving sensor data for the set of physical points from a sensor unit to form received sensor data;

aligning the received sensor data from the sensor unit to a set of place-identifiers in the digital model, wherein a position of the set of physical points is correlated to the digital model to form a correlated position; and storing the correlated position in a storage, wherein if an alignment probability for the correlated position exceeds a predetermined threshold probability, an aligned position is formed, and wherein if the alignment probability for the correlated position does not exceed the predetermined threshold probability an unaligned position is formed.

2. The method of claim 1 wherein, responsive to a store map location command, storing the aligned position of the set of physical points relative to the digital model.

3. The method of claim 1 further comprising:

providing a simultaneous localization and mapping module for tracking a location of the set of physical points.

4. The method of claim 1, wherein the received sensor data comprises data from one or more of a laser triangulation system, an acoustical localizer, an accelerometer, or a set of video cameras of the sensor unit.

5. The method of claim 4, further comprising:

displaying the digital model on an interactive display of the sensor unit.

6. The method of claim 1, wherein the sensor unit is a compact device unit, in communication with a fixed data processing system.

7. The method of claim 1, further comprising:
orienting the sensor unit using a laser pointer on the sensor unit.

8. The method of claim 1, wherein the sensor unit is one of remotely controlled or autonomously controlled.

9. The method of claim 1, wherein the physical points are physical points of a physical object, and wherein the digital model comprises a multi-dimensional description of the physical object.

10. The method of claim 9, wherein the multi-dimensional description of the physical object is a three-dimensional description of the physical object.

* * * * *